United States Patent [19]

Chimura

[11] 3,779,482

[45] Dec. 18, 1973

[54] MAGNETIC RECORDING AND REPRODUCING APPARATUS

[75] Inventor: Toshihiko Chimura, Sohka, Japan

[73] Assignee: Sony Corporation, Tokyo, Japan

[22] Filed: May 26, 1972

[21] Appl. No.: 257,182

[30] Foreign Application Priority Data

May 28, 1971 Japan ............................... 46/44392

[52] U.S. Cl. ................................ 242/190, 274/4 R

[51] Int. Cl. ... B65h 59/38, B65h 63/02, G03b 1/04

[58] Field of Search ........................ 242/75.43, 75.44, 242/189, 190; 200/61.13, 61.18; 274/4 R, 4 D

[56] References Cited

UNITED STATES PATENTS

| | | | |
|---|---|---|---|
| 3,341,141 | 9/1967 | Jura et al. | 242/190 |
| 3,318,544 | 5/1967 | Jones, Jr. | 242/190 |
| 3,389,869 | 6/1968 | Atsumi | 242/190 |

*Primary Examiner*—Leonard D. Christian

*Attorney*—Lewis H. Eslinger et al.

[57] ABSTRACT

An apparatus for recording and/or reproducing signals on a magnetic tape which is wound on supply and take-up reels, preferably within a cassette, and which has a tape drive for transferring the tape from one to the other of the reels during recording, reproducing and other operations of the apparatus, is provided with a tape tension detecting element moved in response to a change in tape tension from a predetermined value or norm, as upon the full unwinding of the tape from one of the reels, for initiating operation of a shut-off device by the tape drive, and such shut-off device provides a shut-off force for halting operation of the tape drive only if the detected change in tape tension from the norm continues for a predetermined period or time delay after initiation of the operation of the shut-off device, whereby to ensure that the tape drive operation will not be halted in response to merely a transitory or temporary change in tape tension.

8 Claims, 5 Drawing Figures

MAGNETIC RECORDING AND REPRODUCING APPARATUS

This invention relates generally to magnetic tape recording and/or reproducing apparatus, and more particularly is directed to the provision of such apparatus which an improved automatic shut-off mechanism.

With the advent of magnetic tape cassettes, the development of low cost and easily operated recording and/or reproducing apparatus for using such cassettes has become desirable. Such apparatus must be capable of performing all of the tape driving functions required for the recording and reproducing operations. Thus, the apparatus must be simply controllable to provide for advancement of forward movement of the tape at a relatively slow speed during the recording and reproducing operations, and also to provide for the relatively fast reeling of the tape in either the forward or reverse directions to permit rapid rewinding of the tape, or to permit the rapid location of a desired portion of the tape on which signals are to be recorded or reproduced.

Since magnetic tape cassettes have the tape wound on supply and take-up reels which are confined within the cassette housing, it is imperative that the driving of the tape be stopped upon the full unwinding of the tape from either of the reels during any of the operating modes of the apparatus in order to avoid the possibility that an end of the tape will be removed and detached from one of the reels within the cassette. If an end of the tape becomes detached from a reel, the cassette housing has to be taken apart to permit rethreading of the tape about the guides provided therefor within the cassette and connection of the tape end to the reel from which it has become detached. The need to disassemble the cassette housing and to rethread the tape within the cassette would obviously sacrifice the major advantage of the cassette type recording and/or reproducing apparatus which is its normal convenience in operation resulting from the fact that mere positioning of the cassette in the apparatus readies the latter for either recording or reproducing operations without the necessity of manually threading the tape in relation to the guides and magnetic head or heads.

Although several arrangements have been proposed and utilized for automatically halting the driving of the tape and reels within the cassette upon the full unwinding of the tape from either of the reels, such existing arrangements all have inherent disadvantages. In one of these previously proposed arrangements, for example, as disclosed in U.S. Pat. No. 3,093,334, a magnetic recording and/or reproducing apparatus for use with tape cassettes is provided with a tension detecting device having an element which extends into the cassette and engages the tape within the latter so that, when the tape is fully unwound from one of the reels, the resulting increased tension in the tape is detected by such device and the latter is effective to halt the operation of the tape drive. However, in the automatic shut-off mechanism of the foregoing type, operation of the tape drive is halted whenever the tape tension exceeds a predetermined value or norm, and such shut-off occurs even if the tape tension is only momentarily increased by a cause other than the full unwinding of the tape from one of the reels. Thus, the existing mechanism can cause an undesired interruption in operation of the apparatus. Further, a recording and reproducing apparatus equipped with the existing automatic shut-off mechanism of the described type requires a specially designed cassette having a non-standard opening in its housing for accommodating the tape engaging element of the tension detecting device. Thus, conventional or standardized tape cassettes cannot be employed. Further, the described arrangement for effecting automatic shut-off of the tape drive is not entirely satisfactory from the point of view of ease of construction and manufacturing costs of the recording and reproducing apparatus.

In another arrangement that has been proposed for effecting the automatic shut-off of the tape drive, the recording and reproducing apparatus is provided with a pair of conductive poles or pins located to extend into the cassette for engagement with the magnetic tape within the latter, and the magnetic tape is provided with conductive leaders at its opposite end portions. With the foregoing arrangement, when the tape is almost fully unwound from either of the reels, the conductive poles detect the presence of the respective conductive leader and a related electrical circuit effects operation of a solenoid or the like by which operation of the tape drive is halted. This arrangement has the obvious disadvantage of being capable of operation only with special tape cassettes, that is, tape cassettes having an opening or openings to receive the conductive poles, and further containing a magnetic tape with conductive leaders at its opposite end portions, which leaders are not normally provided in conventional cassettes.

In still another arrangement that has been proposed for effecting the automatic shut-off of the tape drive, the magnetic tape contained within the cassette is provided with thin transparent leaders at its opposite end portions, and the recording and reproducing apparatus is provided with a light source at one side of the tape path which directs a beam of light toward a photocell or other photoconductive element at the opposite side of the tape path. Thus, when the tape is almost fully unwound from one of the reels within the cassette, the thin transparent leader at the respective end portion of the tape passes between the light source and the photocell so that the latter is influenced by light received from the source to cause a related electrical circuit to effect the shut-off of the tape drive. This arrangement is also disadvantageous in that it requires the use of a special tape cassette, that is, one containing a magnetic tape with transparent leaders at its opposite end portions, and further in that the described arrangement for effecting shut-off of the tape drive may require relatively frequent maintenance and repair.

Accordingly, it is an object of this invention to provide a recording and/or reproducing apparatus with an automatic shut-off mechanism which avoids the above disadvantages of the mentioned existing mechanisms.

Another object is to provide a recording and/or reproducing apparatus with an automatic shut-off mechanism for reliably halting operation of the tape drive when the tape is fully unwound from one of the reels.

Still another object is to provide a recording and/or reproducing apparatus, as aforesaid, in which the automatic shut-off mechanism responds to a tape tension variation which is characteristic of the full unwinding of the tape from one of the reels to cause a halt in operation of the tape drive.

A further object is to provide a recording and/or reproducing apparatus, as aforesaid, in which halting of the operation of the tape drive in response to a transient or temporary change of the tape tension from a predetermined value or norm is avoided.

A still further object is to provide a recording and/or reproducing apparatus, as aforesaid, in which a substantial shut-off force for reliably halting operation of the tape drive is obtained from a shut-off mechanism driven by the tape drive upon the full unwinding of the tape from one of the reels, even though the torque of the tape drive is relatively small.

A still further object is to provide a recording and/or reproducing apparatus with an automatic shut-off mechanism which is simple to operate, even by unskilled personnel, and of low cost construction.

In accordance with an aspect of this invention, an apparatus for recording and/or reproducing signals on a magnetic tape, particularly in the case where the latter extends between and is wound on supply and take-up reels within a cassette, comprises a tape drive for driving the tape during operation of the apparatus, for example, for transferring the tape from one to the other of the reels, tape tension detecting means engageable with the tape for operation in response to a change in the tape tension from a predetermined norm, and shut-off means responsive to the operation of the tape tension detecting means for at least a predetermined period of time to halt the operation of the tape drive. Since operation of the tape drive is halted only when the tape tension detecting means is operated for a predetermined period of time, that is, in response to a change in tape tension that is neither temporary nor transient and therefore is clearly the result of the full unwinding of the tape from one of the reels, spurious or undesired halting of operation of the apparatus during recording or reproducing is avoided.

In a particularly desirable shut-off mechanism according to this invention, such mechanism includes a shut-off drive normally disengaged from the tape drive and being engaged with the latter in response to operation of the tape tension detecting means for causing operation of the shut-off drive by the tape drive, an arrangement for maintaining the engagement of the shut-off drive with the tape drive and thereby continuing the operation of the shut-off drive for providing a shut-off force when the operation of the tape tension detecting means continues for the predetermined period after its initiation, and a shut-off control member which is actuated by the shut-off force for halting operation of the tape drive.

The above, and other objects, features and advantages of the invention, will be apparent in the following detailed description of an illustrative embodiment thereof which is to be read in connection with the accompanying drawings, wherein.

Figure 1:
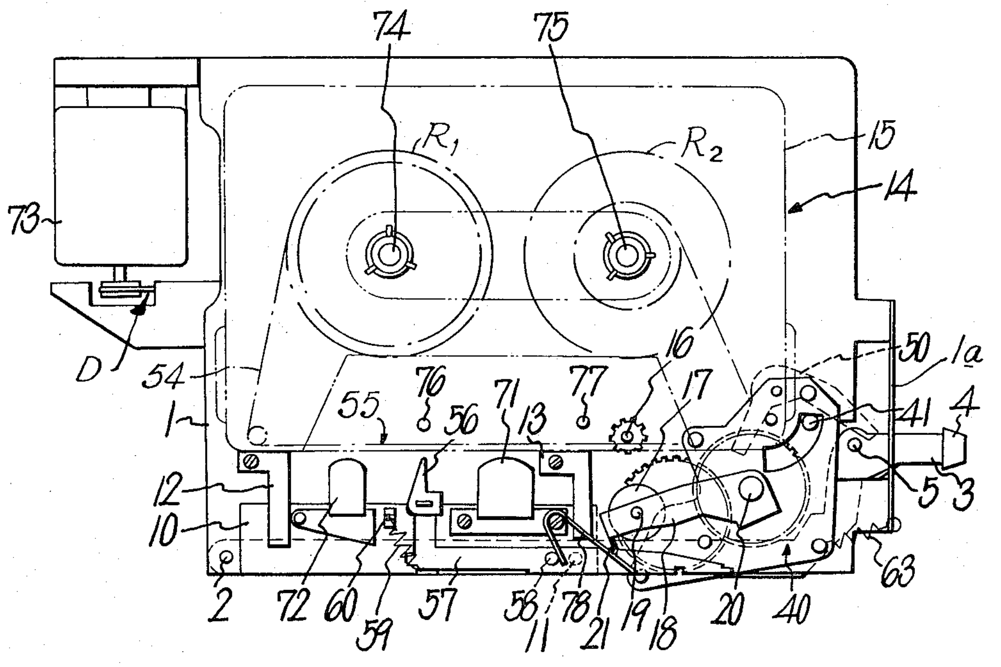
FIG. 1 is a schematic top plan view of a magnetic recording and/or reproducing apparatus having an automatic shut-off mechanism according to an embodiment of this invention.

Referring to the drawings in detail, it will be seen that a magnetic recording and reproducing apparatus having an automatic shut-off mechanism in accordance with this invention includes a chassis 1 which, at one side of its front portion, carries a pivot pin 2 having one end of an operation control lever 3 pivotally supported thereon. The control lever 3 extends from pivot pin 2 across the front of chassis 1 under the latter and has a free end portion that projects slidably through a slotted guide 1*a* at the opposite side of chassis 1. The free end portion of lever 3 terminates in a knob or handle 4 by which control lever 3 can be manually displaced between the extreme positions shown in broken lines and in full lines on FIG. 2 and which respectively correspond to inoperative and operative conditions of the apparatus. For example, control lever 3 may be provided to control the normal forward operation of the apparatus, that is, the driving of the tape in the forward direction at the normal speed employed for either recording or reproducing of signals thereon. In that case, the control lever 3, when in the position shown in full lines on FIG. 1 and in broken lines on FIG. 2, causes a halt in the normal forward drive of the tape and, when in the position shown in full lines on FIG. 2 and on FIG. 3, causes operation of the normal forward tape drive. An omega-shaped toggle spring 7 is connected, at its opposite ends, to anchor pins 6 and 8 which are respectively secured to control lever 3 and chassis 1 so that spring 7 is effective to urge lever 3 toward either of its extreme positions whenever the control lever 3 is displaced beyond a middle or dead-center position at which pivot pin 2 and anchor pins 6 and 8 are on a line with each other.

A head carriage 10 in the form of a laterally elongated plate is disposed above the forward portion of chassis 1 and is slidably constrained by guide members 12 and 13 (FIG. 1) to move in the fore and aft direction relative to the chassis. Control lever 3, approximately at the middle thereof, is formed with a slot 9 which receives a pin 11 depending from head carriage 10 through a suitable opening in chassis 1 so that head carriage 10 is moved rearwardly from the position shown on FIG. 1 in response to the displacement of control lever 3 from the position shown in broken lines to the position shown in full lines on FIG. 2.

A cassette holder or mounting member, indicated generally at 14 on FIG. 1, is provided on chassis 1 in back of head carriage 10 for receiving and positioning a tape cassette 15. The cassette 15 for use with the recording and/or reproducing apparatus having an automatic shut-off mechanism according to this invention may be of standardized or conventional construction and, as shown in broken lines on FIG. 1, generally includes a magnetic tape 54 wound on, and extending between supply and take-up reels $R_1$ and $R_2$ freely rotatable within the cassette housing. As is usually the case, the opposite ends of the tape 54 are secured to reels $R_1$ and $R_2$, respectively, and the tape extending between the reels is directed by guides G within the cassette housing so as to travel in a path 55 along the front edge wall of the cassette housing for exposure at the usual openings or windows (not shown) provided therein. The top and bottom walls of the housing of cassette 15 are provided with the usual openings (not shown) registering with the hubs of reels $R_1$ and $R_2$ and through which rotatable reel drive shafts 74 and 75 projecting upwardly from chassis 1 can extend for rotatable coupling with the respective reels. The top and bottom walls of the cassette housing are further provided, adjacent the front edge, with the usual laterally spaced openings (not shown) for receiving guide pins 76 and 77 which project upwardly from chassis 1 to precisely locate the cassette 15 on holder 14, and further to receive a rotatable capstan 16 projecting upwardly from chassis 1 and disposed immediately in back of tape path 55 in the cassette 15 positioned by holder 14.

A pinch roller 17 is disposed in front of capstan 16 and freely rotatable on a shaft 19 carried by a support arm 18 which is pivoted on a pin 20 extending upwardly from chassis 1. Thus, pinch roller 17 is movable toward and away from capstan 16 by swinging of arm 18 about pivot pin 20. An extension 21 at the free end of arm 18 is engaged by a spring 78 secured on head carriage 10 so that pinch roller support arm 18 is moved about its pivot 20 in response to displacements of head carriage 10, more specifically, so that pinch roller 17 is held away from capstan 16 (FIG. 1) when carriage 10 is in its forward, inoperative position, and so that pinch roller 17 is pressed by the force of spring 78 against capstan 16 when carriage 10 is displaced rearwardly to its operative position. It will be apparent that, when a cassette 15 is positioned on holder 14 and carriage 10 is moved rearwardly to its operative position, the tape 54 in path 55 exposed at a window of the cassette housing adjacent capstan 16 will be engaged between the latter and pinch roller 17 so as to be advanced or driven thereby in response to rotation of the capstan.

As further shown on FIG. 1, carriage 10 may have two magnetic heads 71 and 72 mounted thereon so that, when carriage 10 is moved rearwardly to its operative position, heads 71 and 72 reach through the usual windows in the front edge wall of a cassette on holder 14 for engaging the tape 54 in the path 55. The head 71 may be used for recording and/or reproducing audio or other suitable signals on the magnetic tape 54, while the head 72 may be employed, during a recording operation, for erasing any signals previously recorded on the tape. An electric motor 73 (FIG. 1) is provided for selectively rotating one of the reel drive shafts, for example, the reel drive shaft 75 coupled with the take-up reel $R_2$, and also for rotating the capstan 16 through a suitable pulley and belt transmission indicated schematically at D. The operation of motor 73 may be controlled by a suitable circuit (not shown) including a switch SW (FIG. 2) actuable by control lever 3. Thus, for example, when lever 3 is moved from its inoperative position to its operative position, switch SW is actuated and the associated control circuit causes operation of motor 73 for driving capstan 16 and take-up reel drive shaft 75 by way of transmission D. Since the movement of lever 3 to its operative position also moves head carriage 10 rearwardly, pinch roller 17 is moved against rotated capstan 16 to cooperate with the latter in driving the tape which is then taken-up or wound on rotated take-up reel $R_2$. Further, heads 71 and 72 on carriage 10 engage the tape in path 55 to either record or reproduce signals therein. On the other hand, when control lever 3 is returned to its inoperative position, switch SW is released to halt the operation of motor 73 and thereby cease the rotation of capstan 16 and reel drive shaft 75 for halting the driving of tape 54. Simultaneously, carriage 10 is moved forwardly to disengage pinch roller 17 and heads 71 and 72 from the tape in cassette 15 so that the latter can be removed or replaced on holder 14.

Figure 5:
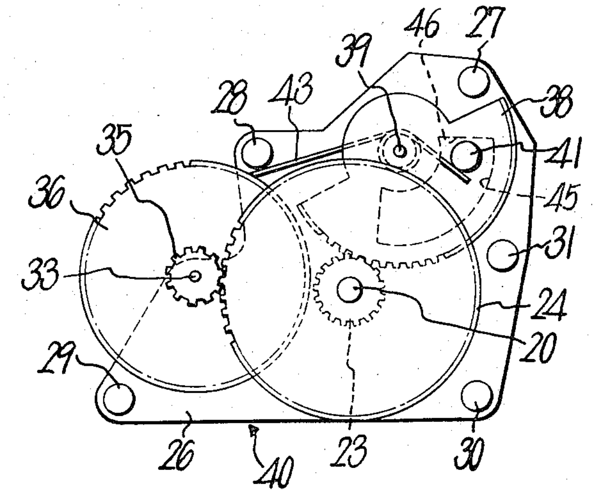
FIG. 5 is a top plan view of a gear assembly included in the shut-off mechanism according to this invention, and which is shown with its upper support plate removed for more clearly exposing the underlying structure.
Figure 4:
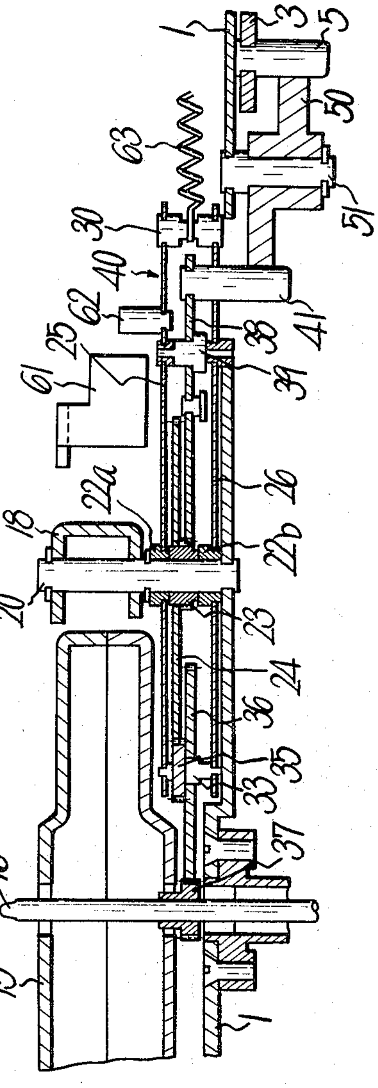
FIG. 4 is a detail, expanded sectional view taken along the line IV—IV on FIG. 3.

In accordance with the present invention, the above described recording and/or reproducing apparatus is provided with a mechanism that automatically shuts off or halts the driving of the tape when the latter is fully unwound from one or the other of reels $R_1$ and $R_2$ in cassette 15. In the illustrated embodiment of this invention, the automatic shut-off mechanism is shown to include a shut-off drive assembly 40 having upper and lower support plates 25 and 26 which are held in parallel, spaced apart relation by spacing pins 27, 28,29,30 and 31 extending between plates 25 and 26 at spaced apart locations along the peripheries of such plates. The middle portions of plates 25 and 26 have bushings **22*a* and 22*b* respectively secured therein (FIG. 4), and such bushings 22*a* and 22*b* are turnable on pin 20 below pinch roller support arm 18. A pinion 23 and a relatively large diameter gear 24, which is either integral with or secured to pinion 23, are rotatably mounted on pin 20 between support plates 25 and 26, as particularly shown on FIGS. 4 and 5. Also mounted between plates 25 and 26 on an axle 33 that extends therebetween adjacent the side of plates 25 and 26 facing toward capstan 16 are a relatively small gear or pinion 35 meshing with gear 24 and a relatively large diameter gear 36 which is rotatably fixed relative to gear 35 and engageable with a gear or pinion 37 fixed on capstan 16** for rotation with the latter.

A sector gear 38 meshes with gear or pinion 23 between plates 25 and 26 and is turnable on an axle or pin 39 journalled in plates 25 and 26. Sector gear 38 has an abutment pin 41 depending therefrom to extend through an arcuate slot 45 formed in lower plate 26 concentric with axle 39. A torsion spring 43 extends around axle 39 and has its opposite end portions engaged against fixed pin 28 and pin 41 on sector gear 38 for urging the latter in the counterclockwise direction as viewed on FIG. 2 to the illustrated position where abutment pin 41 engages an end surface 46 of the arcuate slot 45 in lower plate 26. Upper support plate 25 may also have an arcuate slot aligned with the previously mentioned slot 45 in lower plate 26, as shown. However, the slot in upper plate 25 is not required for operation of the shut-off mechanism and may be omitted.

An L-shaped shut-off control lever 50 is swingably mounted, intermediate its ends, on a pivot pin 51 which depends from chassis 1 so that one arm **50*a* of lever 50 can be located in the path of travel of abutment pin 41 depending from sector gear 38 and the other arm 50*b* of lever 50 is engageable with a pin 5 directed downwardly from operation control lever 3 adjacent the free end of the latter. A coiled tension spring 52 is connected, at its opposite ends, to arm 50*a* of lever 50 and to chassis 1 so as to yieldably urge lever 50 to turn in the clockwise direction, as viewed on FIG. 2, and thereby maintain contact of lever arm 50*b* with pin 5 on control lever 3. When lever 3 is moved to its operative position shown in full lines on FIG. 2, lever 50 is turned against the force of spring 52 to extend its arm 50***a* into the path of pin 41 which remains spaced from arm 50*a* when pin 41 is engaged with end surface 46 of slot 45. Further, a coiled tension spring 63 is connected, at its opposite ends, to spacing pin 30 and to chassis 1 for yieldably urging plates 25 and 26 to turn in the counterclockwise direction about pin 20 to the position shown on FIG. 1 where gear 36 of shut-off drive assembly 40 is spaced from gear 37 on capstan 16 of the tape drive.

The apparatus according to this invention is further shown to comprise a tape tension detecting device which includes a tape engaging member 56 disposed between heads 71 and 72 and being engageable with tape 54 in path 55 through one of the usual windows provided in the front edge wall of the conventional cassette 15. The tape engaging member 56 is mounted at one end of a tension detecting lever 57 which is pivotally mounted, intermediate its end, on a pin 58 carried by the movable head carriage 10. A helical tension spring 59 is connected between the end of lever 57 carrying tape engaging member 56 and a stop element 60 which is secured on carriage 10 for urging lever 57 in the clockwise direction about pivot pin 58 to the position relative to carriage 10 in which stop element 60 is engaged by the adjacent end of lever 57. The end portion of lever 57 remote from tape engaging member 56 has a depending abutment tab 61 which is engageable, when carriage 10 is moved rearwardly to its operative position, with a pin 62 directed upwardly from upper plate 25 of shut-off drive assembly 40. Thus, when carriage 10 is in its rearward, operative position, turning of lever 57 in the counterclockwise direction about its pivot 58 causes abutment tab 61 to act rearwardly against pin 62 for turning shut-off drive assembly 40 about pivot 20 in clockwise direction from the position of FIG. 2 to the position of FIG. 3, that is, so as to engage gear 36 with gear 37.

The above described recording and/or reproducing apparatus having an automatic shut-off mechanism according to this invention operates as follows:

With the apparatus in its stopped or inoperative condition as illustrated on FIG. 1, a cassette 15 is suitably positioned on holder 14. Thereafter, control lever 3 is moved rearwardly about pivot pin 2 to the position shown in full lines on FIG. 2, whereby to move carriage 10 rearwardly to its operative position by reason of the engagement of pin 11 in slot 9, and further to actuate the switch SW. As previously noted, the actuation of switch SW results in the operation of motor 73 for causing rotation of capstan 16 and of the take-up reel drive shaft 75 at speeds that are proper for the normal forwarding or feeding of the tape during recording or reproducing operations of the apparatus. The rearward movement of carriage 10 to its operative position moves head 71 and 72 into engagement with the tape 54 in path 55, and the spring 78 on carriage 10 causes the movement of pinch roller 17 against capstan 16 so that the latter is effective to drive the tape therebetween.

Figure 2:
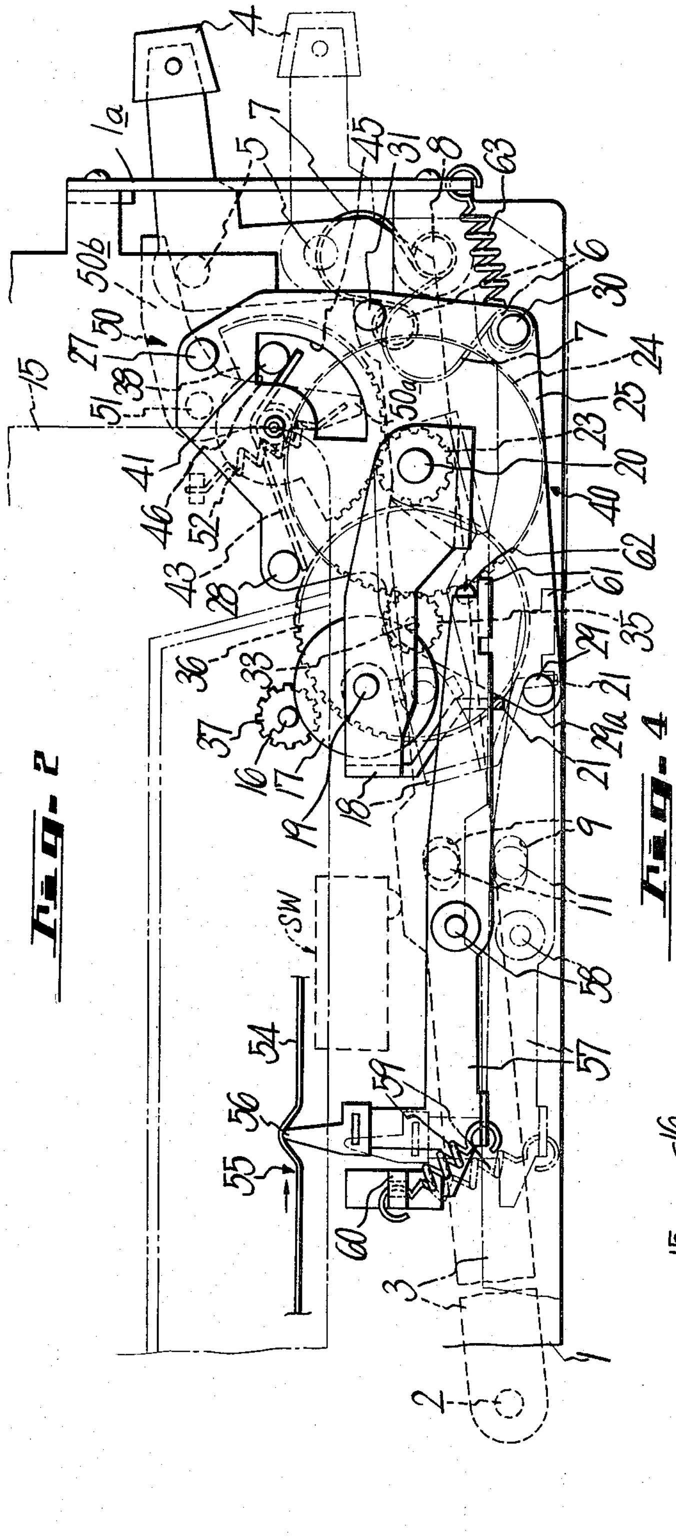
FIG. 2 is an enlarged top plan view of a portion of the apparatus illustrated in FIG. 1, and with the parts thereof being shown in the condition for a recording or reproducing operation of the apparatus.

The rearward movement of lever 3 for initiating a recording or reproducing apparatus, as described above, is further effective to turn shut-off control lever 50 from the position shown on FIG. 1 to the position shown on FIG. 2 in which its arm 50*a* projects into the path of movement of pin 41 on sector gear 38. The rearward displacement of head carriage 10 to its operative position is further effective to move the pivot pin 58 of tension detecting lever 57 from the position shown in broken lines to the position shown in full lines on FIG. 2, with the result that member 56 on lever 57 is made to protrude through a usual window in the cassette housing and extend across the tape path 55, as shown in full lines on FIG. 2. The spring 59 connected to lever 57 exerts a sufficient force to maintain the adjacent end of lever 57 in contact with stop member 60 against the normal tension in tape 54 engaged by member 56 and which produces a forwardly directed force on the latter. Further, spring 59 is sufficiently strong so that, when pivot 58 moves with carriage 10 to the position indicated in full lines on FIG. 2, lever 57 remains in contact with stop member 60 while abutment tab 61 acts rearwardly against pin 62 for pivoting 25 and 26 about pivot 20 to the position shown in full lines on FIG. 2 against the counter-urging of spring 63. It will be seen that, although the spacing of gear 36 from gear 37 on capstan 16 is narrowed in response to the rearward movement of carriage 10 to its operative position and the corresponding movement of the pivot 58 of lever 57 to the position shown in full lines on FIG. 2, gear 36 still remains out of engagement in respect to gear 37 on capstan 16 so long as the tension in tape 50 does not vary from the predetermined value or norm. With the various parts of the apparatus in the positions shown in full lines on FIG. 2, the apparatus is in its operating condition, that is, it carries out a recording or reproducing operation in the known manner with the tape 54 being driven by the cooperative action of capstan 16 and pinch roller 17 which results in the unwinding of the tape from supply reel $R_1$ while the tape is rewound on take-up reel $R_2$ driven by reel shaft 75.

When the tape has been fully unwound from supply reel $R_1$, the tension in the tape increases abnormally, as compared with that encountered during normal tape movement, due to the fact that the end of tape 54 is fixed to supply reel $R_1$ while take-up reel $R_2$ and capstan 16 seek to draw additional tape from reel $R_1$. Such abnormal increase in the tape tension causes the tape in path 55 to exert an increased forwardly directed force on tape engaging member 56 whereby to overcome the force of spring 59 and pivot lever 57 to the position shown on FIG. 3. The pivoting of lever 57 to the position shown on FIG. 3 causes abutment tab 61 to act further rearwardly against pin 62 with the result that plates 25 and 26 are further turned about pivot 20 in the clockwise direction against the influence of spring 63 to the position shown on FIG. 3 at which gear 36 is in meshing engagement with gear 37 rotating with capstan 16. On the meshing engagement of gears 36 and 37, such gears and the additional gears 23, 24 and 35 provide a gear train for driving sector gear 38 from rotated capstan 16. Since gears 37,35 and 23 are shown to have small pitch diameters in relation to the diameters of the gears 36, 24 and 38 with which they respectively engage, it will be apparent that the speed at which sector gear 38 is small in relation to the rotational speed of capstan 16. For example, in an automatic shut-off mechanism according to this invention, the pitch diameters of gears 37 and 36 may have the ratio 1/4, the pitch diameters of gears 35 and 24 may have the ratio 1/4.5, and the pitch diameters of gears 23 and 28 may have the ratio 1/4, in which case, the engagement of gear 36 with gear 37 on capstan 16 will cause sector gear 38 to turn at a speed which is about 1/72 the speed of capstan 16. Thus, for example, if it is desired to drive the tape at a speed of 4.8 cm/sec. and capstan 16 is diametrically dimensioned to provide that tape speed when turning at 4 r.p.s. then sector gear 38 would be turned at a speed of 1/18 r.p.s. upon engagement of gear 36 with gear 37. It will be understood that such relatively slow speed turning of sector gear 38 is effected in the clockwise direction, as viewed on FIG. 3, that is, in opposition to the force of spring 43, so as to move the pin 41 on gear 38 away from end surface 46 of slot 41. After a predetermined period of time, for example, 2 seconds, from the instant when rotation or turning of sector gear 38 is commenced, pin 41 on gear 38 arrives at the position indicated in broken lines on FIG. 3 and comes into engagement with lever arm 50*a*. Thereafter, further turning of sector gear 38 is effective to turn shut-off control lever 50 in the clockwise direction about pivot 51, so that lever arm 50*b* acts forwardly against pin 5 on lever 3 for forwardly displacing lever 3 about pivot pin 2. It will be apparent that, as pin 41 turns with sector gear 38 in the clockwise direction beyond the position shown in broken lines on FIG. 3 and acts accordingly on arm 50*a* of lever 50, there is a reaction force (indicated by the arrow F on FIG. 3) on pin 41 resulting from the fact that spring 7 opposes the above described forward displacement of lever 3 by shut-off control lever 50. Since pin 41 is spaced from the pivot 20 of plates 25 and 26, the described reaction force F, which is transmitted to plates 25 and 26 through gear 38 and axle 39, urges plates 25 and 26 to turn about pivot 20 in the clockwise direction, that is, in the direction for urging gear 36 against gear or pinion 37 on capstan 16. Thus, once pin 41 has been moved to the position indicated in broken lines on FIG. 3 where it engages and begins to act upon arm 50*a* of lever 50, the meshing engagement of gear 36 with gear 37 for continuing the movement of pin 41 with gear 38 no longer depends on the tape tension and will not be interrupted even if the tension in tape 54 is reduced to the normal value to permit return of lever 57 to the position shown in full lines on FIG. 2.

When the continued turning of sector gear 38 and pin 41 has caused shut-off control lever 50 to effect forward displacement of control lever 3 beyond its dead-center position, that is, forwardly beyond the position where pivot pin 2 and anchor pins 6 and 8 of spring 7 are all on a straight line, the force of spring 7 then becomes effective to complete the return of lever 3 forwardly to its inoperative position shown in broken lines on FIG. 2, and at which switch SW is disengaged to halt the operation of motor 73, whereby to stop the rotation of capstan 16 and reel drive shaft 75. Further, the return of lever 3 to its forward inoperative position is effective to return head carriage 10 to its forward inoperative position, as shown on FIG. 1, where pinch roller 17 is separated from capstan 16, and tape engaging member 56 and heads 71 and 72 are withdrawn from the cassette.

When head carriage 10 is restored to its forward inoperative position, and thus returns tape tension detecting lever 57 to the position shown in broken lines on FIG. 2, the abutment tab 61 on lever 57 is thereby moved away from pin 62 on plate 25 and can no longer act on the pin 62 for overcoming the force of spring 63 and thereby maintaining engagement of gear 36 with gear 37. Further, upon the movement of control lever 3 to its forward, inoperative position, shut-off control lever 50 is moved by spring 52 to the position shown on FIG. 1, in which arm 50*a* of lever 50 is remote from pin 41 on sector gear 38 so that no reactive force, similar to the force F on FIG. 3, can act on pin 41 for maintaining engagement of gear 36 with gear 37. Therefore, spring 63 turns plates 25 and 26 in the counterclockwise direction about pivot 20 for restoring the shut-off drive assembly 40 to the position shown on FIG. 1 in which gear 36 is disengaged from gear 37. Accordingly, spring 43 is then free to act on pin 41 and turn sector gear 38 in the counterclockwise direction back to the position shown on FIGS. 1–3, in which pin 41 engages end surface 46 of slot 45. Thus, all of the parts of the apparatus, and particularly of its automatic shut-off mechanism are returned to their initial positions.

It will be seen that, in the automatic shut-off mechanism according to this invention, as described above, the force for actually moving control lever 3 back to its forward inoperative position, and thereby halting the driving of the tape, is derived from capstan 16 of the tape drive through the reduction gearing 23,24,25,35,36,37 and 38 by which pin 41 is relatively slowly moved as a result of the rotation of capstan 16. Thus, even if the torque with which capstan 16 is driven is relatively small, the foregoing reduction gearing provides a very substantial mechanism advantage by which pin 41 can exert a considerable force on lever 50 for displacing control lever 3 forwardly toward its inoperative position. Further, it will be seen that the device for detecting a variation or change in the tape tension from a predetermined value or norm is relied upon only for achieving the engagement of gear 36 with driven gear 37 until such time as pin 41 has been moved sufficiently to act against lever arm 50*a*, whereupon as previously described, the force for moving lever 3 to its inoperative position is derived from the tape drive or capstan 16, rather than from the tape tension detecting device. After pin 41 has been moved into engagement with lever arm 50*a*, the engagement of gear 36 with gear 37 is then maintained securely by the reaction force F on pin 41 arriving from the resistance of spring 7 to the displacement of lever 3 by lever 50. Therefore, during the actual application of the force for moving lever 3 to its inoperative position, a reaction to the applied force, rather than a force resulting from the detected change in tape tension, is relied upon for maintaining the engagement of gears 36 and 37 with each other.

Figure 3:
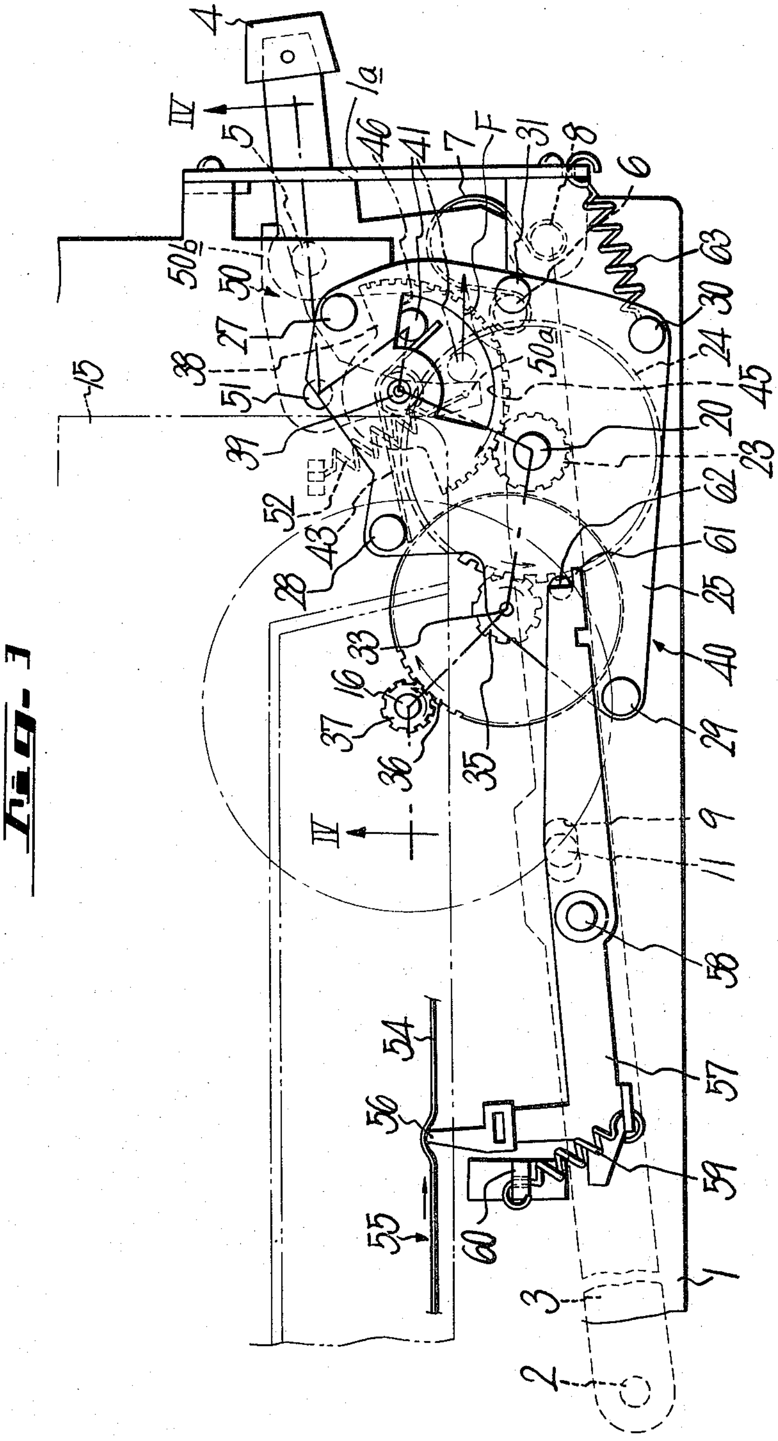
FIG. 3 is a view similar to that of FIG. 2, but showing the relative positioning of the parts when automatic shut-off of the apparatus is initiated, for example, in response to the full unwinding of the magnetic tape from one of the reels.

Further, in the automatic shut-off mechanism according to this invention, the movement of pin 41 is transmitted to shut-off control lever 50 and from the latter to control lever 3 for effecting movement of the latter to its inoperative position, for example, for shutting off the tape drive, only if the detected increase or change in the tape tension from the predetermined value or norm has persisted for the significant period of time required for the relatively slow movement of pin 41 from against end surface 46 of slot 45 to the position indicated in broken lines on FIG. 3 where pin 41 first comes into engagement with lever arm 50*a*. Thus, the automatic shut-off mechanism according to this invention ensures that operation of the tape drive will not be erroneously halted in response to a merely temporary or transient increase in tape tension that results from a cause other than the full unwinding of the tape from one of the reels. For example, the tape tension detected by member 56 on lever 57 may increase momentarily upon the engagement of member 56 with a splice or joint in the magnetic tape 54. The occurrence of such a momentary increase in tape tension causes movement of lever 57 to the position shown on FIG. 3 so as to engage gear 36 with gear 37 on capstan 16 and thereby initiate the movement of pin 41 on sector gear 38 away from end surface 46 of arcuate slot 45. However, if the detected tape tension returns to its normal value prior to the movement of pin 41 to the position indicated in broken lines on FIG. 3, lever 57 is automatically returned by spring 59 to the position shown in full lines on FIG. 2 and spring 63 acts on support plates 25 and 26 to again separate gear 36 from the driven gear 37, whereupon spring 43 is effective to return pin 41 to its initial position against end surface 46. Accordingly, the operation of the automatic shut-off mechanism is aborted and the change in the operating condition of the recording and/or reproducing apparatus, for example, the halting of the tape drive, is positively avoided. By reason of the reduction gearing provided for driving pin 41 from capstan 16, the movement of pin 41 from its initial position shown in full lines on FIG. 3 to the position shown in broken lines at which pin 41 commences to act against lever arm 50*a* requires a significant time period, and deviation of the detected tape tension from the predetermined value or norm will occur over that significant time period only in response to the full unwinding of the tape from a reel.

In the illustrated embodiment of this invention, as described above, the full unwinding of the tape from one of the reels has been detected by an increase in the tape tension, as is the case when the ends of the tape are secured to the supply and take-up reels. However, it is obvious that the described apparatus can be simply modified so that the initial displacement of plates 25 and 26 about pivot 20 for causing engagement of gear 36 with driven gear 37 occurs upon angular displacement of lever 57 in response to the detection by member 56 of a decreased tension in the run 55 of tape 54, for example, as is the case upon the full unwinding of the tape from a so-called open reel. Further, in the illustrated embodiment of the invention, the automatic shut-off mechanism has been relied upon to halt the driving of the tape during a recording or reproducing operation upon the full unwinding of the tape from the supply reel. However, it will be apparent that the described automatic shut-off mechanism can be employed to halt the tape drive upon the full unwinding of the tape from either of its reels during either the fast forward operation or the rewinding operation of the recording and/or reproducing apparatus.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention.

What is claimed is:

1. An apparatus for recording and/or reproducing signals on a magnetic tape, comprising tape drive means for driving the tape during operation of the apparatus, tape tension detecting means engageable with the tape for operation in response to a change in the tape tension from a predetermined norm, shut-off drive means engaged with said tape drive means in response to said operation of the tape tension detecting means for operating said shut-off drive means from said tape drive means, means for maintaining the engagement of said shut-off drive means with said tape drive means, and thereby continuing the operation of said shut-off drive means for providing a shut-off force, when said operation of said tape tension detecting means continues for a predetermined period following the initiating thereof, and means actuated by said shut-off force for halting operation of said tape drive means.

2. An apparatus for recording and/or reproducing signals on a magnetic tape which is wound on supply and take-up reels, comprising tape drive means operative for transferring the tape from one to the other of said reels during operation of the apparatus, tape tension detecting means engageable with the tape between said reels for operation in response to a change in the tape tension from a predetermined norm, shut-off drive means normally disengaged from said tape drive means and being engaged with the latter in response to said operation of the tape tension detecting means for causing operation of said shut-off drive means by said drive means, means for maintaining the engagement of said shut-off drive means with said tape drive means, and thereby continuing the operation of said shut-off drive means for providing a shut-off force, when said operation of said tape tension detecting means continues for a predetermined period after the initiation thereof in response to the full unwinding of the tape from one of said reels, and means actuated by said shut-off force for halting operation of said tape drive means.

3. An apparatus for recording and/or reproducing signals on a magnetic tape which is wound on supply and take-up reels, comprising tape drive means operative for transferring the tape from one to the other of said reels during operation of the apparatus, tape tension detecting means engageable with the tape between said reels for operation in response to a change in the tape tension from a predetermined norm, shut-off drive means, support means carrying said shut-off drive means and being movable between a normal position, where said shut-off drive means is free of said tape drive means, and a displaced position to which said support means is moved by said tape tension detecting means upon said operation of the latter and where said shut-off drive means engages said tape drive means and is driven by the latter, an abutment member on said shut-off drive means urged in one direction to an initial position relative to said support means and being movable in the opposite direction from said initial position in response to driving of said shut-off drive means, and a shut-off control member spaced from said abutment member in said initial position of the latter and being actuable by said abutment member for halting operation of said tape drive means only upon movement of said abutment member a predetermined distance in said opposite direction from said initial position in response to operation of said tension detecting means for a predetermined period upon the full unwinding of the tape from one of said reels.

4. An apparatus according to claim 3; in which said support means is mounted for movement about a pivot axis between said normal and displaced positions, said abutment member acts on said shut-off control member at a distance from said pivot axis for providing a reactive force which maintains said support means at said displaced position for so long as said tape drive means continues to operate.

5. An apparatus according to claim 3; in which said tape drive means includes a rotated drive gear, and said shut-off drive means includes a gear mechanism having an input gear member for meshing engagement with said drive gear in said displaced position of the support means and an output gear member having said abutment member thereon.

6. An apparatus according to claim 5, in which said gear mechanism includes reduction gear means between said input and output gear members for delaying the movement of said abutment member from said initial position through said predetermined distance prior to actuation of said shut-off control member and for relatively increasing the force available for said actuation from said tape drive means.

7. An apparatus according to claim 3, in which there is a pivoted control lever movable between extreme positions corresponding respectively to operative and inoperative conditions of said tape drive means, spring means urge said control lever to each of said extreme positions from a mid-point therebetween, and said shut-off control member, when actuated, displaces said control lever beyond said mid-point in the direction toward the extreme position corresponding to said inoperative condition.

8. An apparatus according to claim 7; in which said tape drive means includes a capstan rotated upon operation of the tape drive means, a pinch roller movable toward and away from said capstan, and means moving said pinch roller against said capstan for driving the tape therebetween in response to the movement of said control lever to its extreme position corresponding to said operative condition of the tape drive means.

* * * * *